Figure 1:
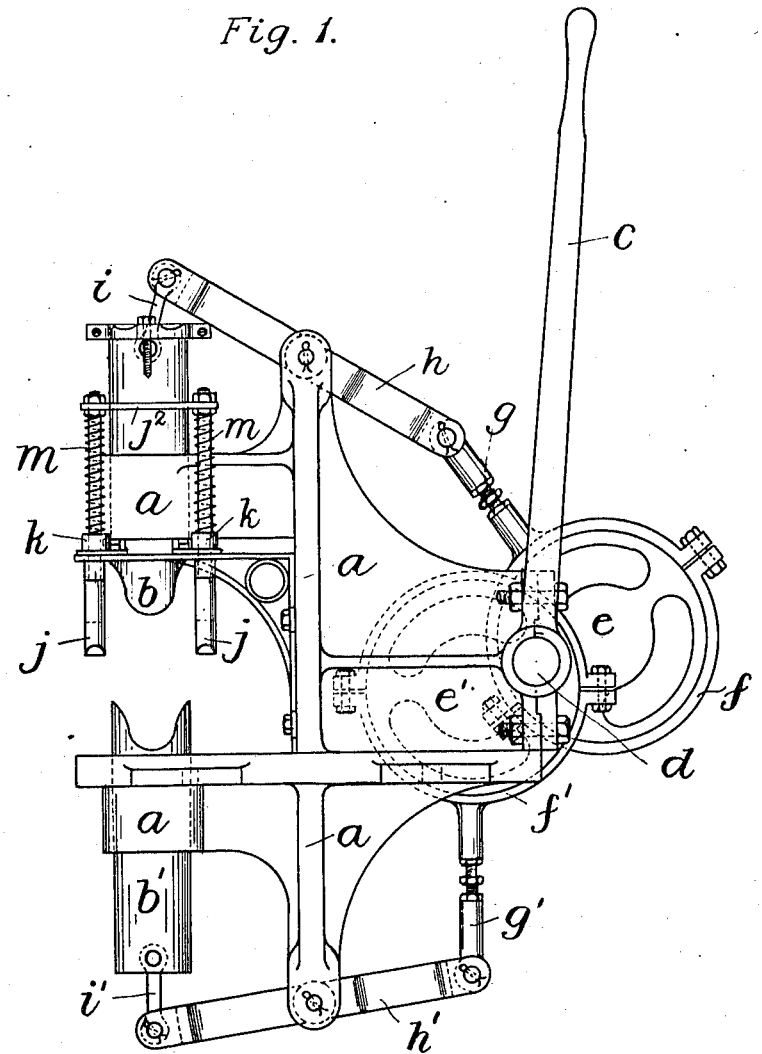

F. H. SMITH.
MACHINE FOR MAKING HOLLOW INDIA RUBBER BALLS.
APPLICATION FILED DEC. 27, 1910.

1,004,096.

Patented Sept. 26, 1911.

3 SHEETS—SHEET 1.

WITNESSES

INVENTOR
Frederick Henry Smith
BY
ATT'Y.

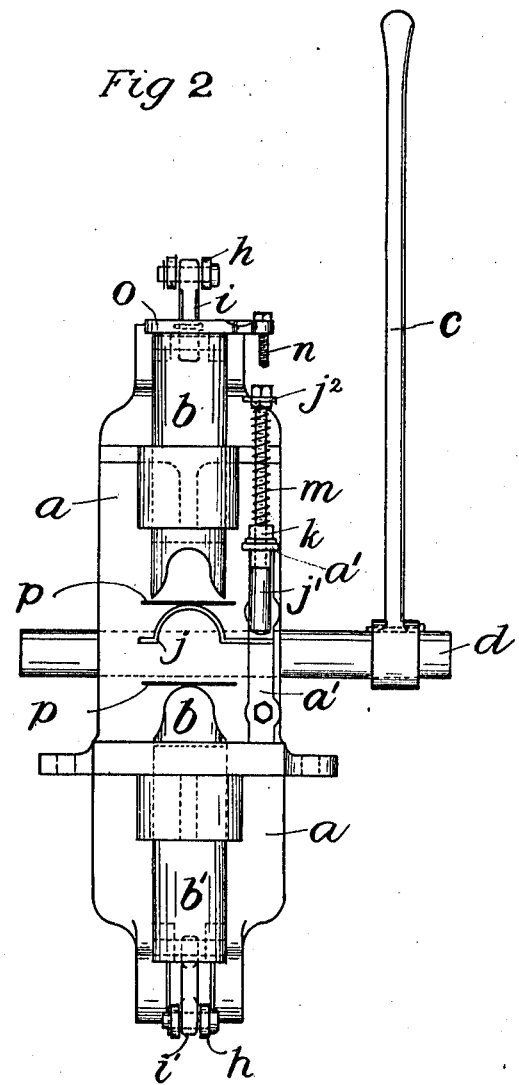

F. H. SMITH.
MACHINE FOR MAKING HOLLOW INDIA RUBBER BALLS.
APPLICATION FILED DEC. 27, 1910.
1,004,096.
Patented Sept. 26, 1911.
3 SHEETS—SHEET 3.
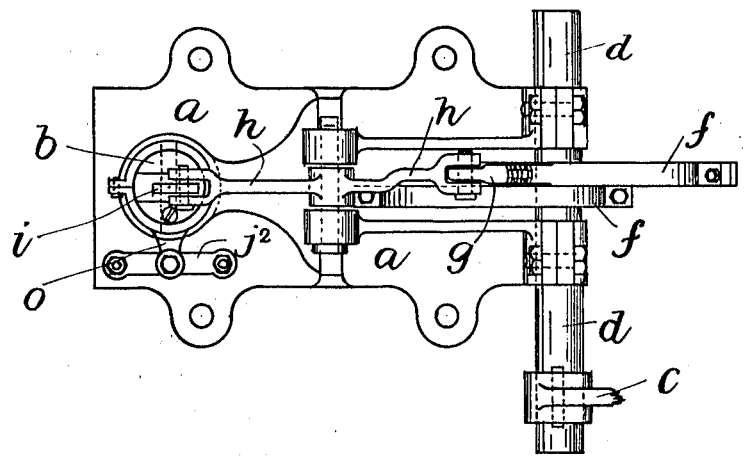
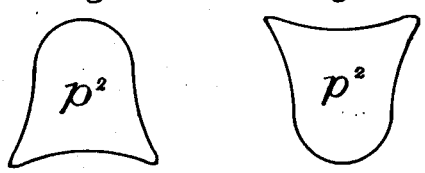

UNITED STATES PATENT OFFICE.

FREDERICK HENRY SMITH, OF ECCLES, ENGLAND, ASSIGNOR TO NEW ECCLES RUBBER WORKS LIMITED, OF ECCLES, ENGLAND.

MACHINE FOR MAKING HOLLOW INDIA-RUBBER BALLS.

1,004,096.      Specification of Letters Patent.      Patented Sept. 26, 1911.

Application filed December 27, 1910. Serial No. 599,406.

*To all whom it may concern:*

Be it known that I, FREDERICK HENRY SMITH, a subject of the King of Great Britain, residing at Monton Road, Eccles, in the county of Lancaster, England, have invented new and useful Improvements in Machines for Making Hollow India-Rubber Balls, of which the following is a specification.

My invention relates to improvements in machines for making hollow india rubber balls. Hitherto the best known type of machine for making such balls has consisted of a four leaved cutter, each leaf consisting of a segmental cutter hinged to a common shank or plunger and also connected on the outside to links or toggles, which, when the vertically reciprocating plunger is drawn down closes the hinged segmental cutters upon a single sheet of solutioned india rubber and in closing cuts off the superfluous portions of the sheet and simultaneously unites the solutioned contiguous edges and so forms the sheet into an approximate square which is then removed and placed in a mold for vulcanizing and converting into a spherical shape to form the desired hollow ball in the usual way.

The present improvements comprise the arrangement of two vertically reciprocating dies mounted in slides or guides and arranged when closed to cut out from two separate sheets of solutioned india rubber two approximately elliptical or oval pieces, crossing each other at right angles, and to fold up and unite the edges of such pieces into an approximately round ball which is then converted into a true sphere during the vulcanizing process and subsequently finished and inflated in the usual way.

I illustrate an embodiment of the invention in the accompanying three sheets of drawings, in which—

Figure 1 is a side elevation, Fig. 2 a front elevation and Fig. 3 a top plan view of the machine. Fig. 4 is a longitudinal sectional elevation of one of the reciprocating dies on a larger scale. Fig. 5 is a plan of one of the rubber sheets, of which two are employed to form the two approximately elliptical or oval shaped pieces indicated in dotted lines, and one of which is shown in Fig. 6. Figs. 7 and 8 are views of the approximately round ball after the two pieces, Fig. 5, have been cut out and united by the action of the dies.

In these views:—$a$ designates the stand or frame of the machine which is supported in a table or frame or in any other convenient manner; $b$ $b'$ the two dies which are both formed from the same pattern and the upper of which is shown on an enlarged scale in Fig. 4. These dies are preferably formed of cast steel and are fitted to reciprocate vertically up and down in suitable slides or guides in the frame $a$, the dies being set at a right angle, the one to the other, in order that the jaws of the one may fit into the other when meeting.

The dies $b$ $b'$ may be operated in any convenient manner and by any suitable power; but in the example illustrated I show a hand operated machine comprising a hand lever $c$ fixed upon a shaft $d$ upon which are keyed two eccentrics $e$ $e'$, the straps $f$ $f'$ of which are connected respectively by adjustable links $g$ $g'$, levers $h$ $h'$ and links $i$ $i'$ to the two vertically reciprocating dies $b$ $b'$.

Between the two dies $b$ $b'$ I mount a pair of supports $j$, the shanks $j'$ of which are coupled at the top by a cross piece $j^2$. The shanks $j'$ slide through two collars $k$ supported on a bracket $a'$ against the resistance of a pair of springs $m$ coiled on the shanks and confined between the cross piece $j^2$ and collars $k$. The cross piece $j^2$ is caused to slide and the supports $j$ are carried down over the cutting edge of the die $b'$ when the die $b$ is moved down by the connections described from the hand lever $c$ and the downward movement of the cross piece $j^2$ is effected by an adjustable screw $n$ carried in a clip or ring $o$ fixed to the upper die $b$, as shown, or by any other suitable means.

In operation, a square or other suitably shaped piece of india rubber $p$, as shown detached in Fig. 5, is placed upon the supports $j$ and a similar piece $p$ is placed on the top of the lower die $b'$, then by means of the hand lever $c$ or any other suitable operating mechanism, as the case may be, the die $b$ is moved vertically downward and the die $b'$ vertically upward until the upper die meets the upper solutioned sheet $p$ resting on the supports $j$ and in its continued movement carries down the same in its jaws until the two dies $b$ $b'$ meet and close and thereby cut out of the two solutioned sheets $p$ two approximately elliptical pieces $p'$ of the form indicated in Fig. 6, and occupying the relative positions indicated by dotted lines in Fig. 5. As the dies close they also unite the solutioned edges of the pieces $p'$ and form an approximately round ball $p^2$ of the shape shown in the two detail views Figs. 7 and 8. This ball $p^2$ is then vulcanized and inflated in the mold in the usual way and by known methods to its true spherical shape and can be subsequently painted and enameled or otherwise treated as desired.

What I claim as my invention and desire to secure by Letters Patent is:—

1. In a ball-forming machine, in combination, a pair of oppositely disposed dies, said dies being shaped to cut substantially elliptical pieces from two solutioned pieces of sheet rubber, said dies being so positioned relatively to one another that the major axis of the elliptical pieces cut by one of the dies will be at an angle with the major axis of the elliptical pieces cut by the other die, and means for moving one of said dies into and out of engagement with the other of said dies, said dies being shaped to force the edges of the two elliptical pieces together, whereby they will be united to one another to form an approximately round ball.

2. In a ball-forming machine, in combination, a pair of oppositely disposed dies, said dies being shaped to cut substantially elliptical pieces from two solutioned pieces of sheet rubber, said dies being so positioned relatively to one another that the major axis of the elliptical pieces cut by one of the dies will be at right angles with the major axis of the elliptical pieces cut by the other die, and means for moving one of said dies into and out of engagement with the other of said dies, said dies being shaped to force the edges of the two elliptical pieces together, whereby they will be united to one another to form an approximately round ball.

In testimony whereof I have signed my name to this specification in the presence of two subscribing witnesses.

FREDERICK HENRY SMITH.

Witnesses:
S. W. GILLETT,
HERBERT ROWLAND ABBEY.

---

Copies of this patent may be obtained for five cents each, by addressing the "Commissioner of Patents, Washington, D. C."